United States Patent [19]

Pyle et al.

[11] Patent Number: 5,367,337
[45] Date of Patent: Nov. 22, 1994

[54] METHOD AND APPARATUS FOR CAPTURING VIDEO IMAGES

[75] Inventors: Harry S. Pyle; Norman H. Bahr; Paul G. Nietfeld, all of San Antonio, Tex.

[73] Assignee: Image Data Corporation, San Antonio, Tex.

[21] Appl. No.: 876,580

[22] Filed: Apr. 30, 1992

[51] Int. Cl.⁵ .............................................. H04N 5/08
[52] U.S. Cl. .................................... 348/521; 348/531; 348/537; 348/558
[58] Field of Search ............... 358/148, 149, 150, 151, 358/152, 153, 154, 155, 156, 157, 158, 159, 166, 17, 19, 18, 21 R; 341/110, 112, 113, 114, 122, 123, 139; 348/500, 510, 511, 513, 516, 521; H04N 5/04, 5/06, 5/08

[56] References Cited

U.S. PATENT DOCUMENTS

| | | |
|---|---|---|
| 4,567,521 | 1/1986 | de la Guardia et al. ............ 358/150 |
| 4,595,953 | 6/1986 | Willis . |
| 4,675,734 | 6/1987 | Widom .............................. 358/153 |
| 4,736,238 | 4/1988 | Moriyama et al. . |
| 4,743,958 | 5/1988 | Bannister et al. . |
| 4,847,678 | 7/1989 | McCauley . |
| 4,864,399 | 9/1989 | Romesburg et al. . |
| 4,872,054 | 10/1989 | Gray et al. ......................... 358/148 |
| 4,887,279 | 12/1989 | Odenheimer . |
| 4,893,319 | 1/1990 | Ziuchkovski . |
| 4,942,468 | 7/1990 | Yokouchi et al. . |
| 4,943,857 | 7/1990 | Izuno et al. . |
| 4,970,581 | 11/1990 | O'Gwynn . |
| 5,019,899 | 5/1991 | Boles et al. . |
| 5,031,041 | 7/1991 | Fling ................................. 358/153 |
| 5,134,481 | 7/1992 | Gornati et al. ..................... 358/153 |
| 5,166,781 | 11/1992 | Walby et al. ...................... 358/149 |

*Primary Examiner*—James J. Groody
*Assistant Examiner*—Michael H. Lee
*Attorney, Agent, or Firm*—Baker & Botts

[57] ABSTRACT

Apparatus and method are provided which receive and sample an incoming video image signal asynchronously, and then processes the signal to recover the video image, including video format, for conversion into a preselected video format. The apparatus and methods first sample the video signal using a stable (crystal oscillator) time base clock to reconstruct the frequency of the video signal, i.e., to recover the video format and then using a contrast optimization process to determine the video signal pixel clock rate.

22 Claims, 12 Drawing Sheets

| determine horizontal line parameters (initially sample at 32 Mhz) | 701 |

701a  activate video sync capture (pulse indicator) circuit
    701b  set black and white levels above input video level (avoid conflicts between active video and sync pulse indicators)
    701c  set sync slice level to minimum value
    701d  set clamp length to minimum value
    701e  acquire image (sync indicators only)
    701f  determine horizontal sync pulse length and time (construct histogram of all sync pulse lengths and select most common)
    701g  set acquire-trigger-count to two times horizontal sync pulse length
    701h  determine horizontal line length and time (samples per line) (construct histogram of all line lengths and select most common)
    701i  select clamp time (min of horizontal sync pulse or function of horizontal line length)

| determine video signal voltage levels | 702 |

702a  deactivate video sync capture (pulse indicator) circuit
    702b  set white level to maximum value
    702c  set black level to minimum value ( < sync tip)
    702d  acquire image
    702e  search input samples for maximum and minimum values
    702f  set white level to maximum value of samples (convert to voltage)
    702g  set black level to zero volts (blanking level)
    702h  set sync tip level to minimum value of samples (convert to voltage) (assume maximum voltage range is divided 2/3 video and 1/3 synchronization pulse)
    702i  set sync slice level at 1/2 of voltage of sync tip (convert to voltage)

| determine video signal format parameters | 703 |

703a  define vertical sync pulse as a contiguous block of sync pulse indicators at least two times length of horizontal sync pulse; define horizontal sync pulse as a contiguous block of sync pulse indicators less than twice the length of horizontal sync pulse; define full horizontal line as starting with a horizontal sync pulse and within percentage (10%) of horizontal line length
    703b  determine if video is interlaced (define interlace as when the second field of two consecutive fields has an integral number of lines plus a half line between the first vertical sync pulse and the first full horizontal line)
        703b,i  locate last full horizontal line in previous (first) field
        703b,ii  locate leading edge of first vertical sync pulse (second field)
        703b,iii  determine if two points are an integral number of line lengths apart
        703b,iv  if not integral number then interlaced and odd field is second field

Fig. 6A1

703b,v    if integral number then redo above steps for third field and if not integral then interlaced (and third field is odd field) or if integral then not interlaced or 703b,vi   if unable to locate first vertical sync pulse in third field then video not interlaced

| determine lines per field (define lines per field as the integral number of lines (whether full or partial) from the end of one vertical sync pulse to the start of the next vertical sync pulse) | 704 |

704a   locate first full horizontal line in field
704b   locate last full horizontal line in field
704c   set minimum no. of full horizontal lines equal to number of lines from first full horizontal line to last full horizontal line
704d   set line count equal to minimum no. of full horizontal lines
704e   locate first full horizontal line in next field
704f   line count = line count + number of full horizontal line lengths from the last full horizontal line of first field to first full horizontal line of second field
704g   if interlaced video repeat above for next field and select smaller of two minimum no. of full horizontal lines and set line count = (first field line count + second field line count) ÷ 2

| determine number of input pixel clocks per line | 705 |

705a   set pixel clocks per line to initial value of 4/3* (lines per image), where lines per image is lines per field (if interlaced) or two times lines per field (if non-interlaced)
705b   user place window over high contrast area (text)
705c   initialize phase to zero
705d   resample window area with assumed phase and initial value of pixel clocks per line
705e   calculate contrast measurement for resampled area 705e,i   calculate $\sum_M \sum_N (P_{M,N} - P_{M,N+1})^2$, where M indexes through rows, N indexes through columns and $P_{M,N}$ is an output pixel 705f   increment assumed phase by <u>desired</u> subsample resolution (typical phase resolution is 1/10 of a pixel)
705g   repeat resampling, calculating and incrementing steps until entire range of a pixel has been evaluated

Fig. 6A2

705h repeat initializing, resampling, calculating, incrementing and repeating steps for desired range of pixel clocks per line values around initial value
705i select pixel clocks per line value that provides maximum contrast

| determine optimal sample rate | 706 |
|---|---|

706a set no. of samples required to product of samples per line at high sample rate and lines per field
706b if video interlaced then no. of samples required is set "value" of no. of samples times two
706c determine if samples per line divided by output pixel clocks per line is less than two
706d determine if no. of samples required is less than size of current memory
706e if either "determine" step is not true then select low sample rate

| determine active video window | 707 |
|---|---|

707a set height of windows to rows covered by full horizontal lines
707b set width to number of pixel clocks per line reduced by a horizontal sync pulse and a clamp length (both in output pixels)

| store data representing determined and set parameters | 708 |
|---|---|

Fig. 6A3

| acquire video signals and sync pulse indicator information | ~801 |

| determine number of samples acquired | ~802 |

802a  locate first horizontal sync pulse following first vertical sync pulse
    802b  determine if line is a full horizontal line
    802c  count line and accumulate total count of number of lines
    802d  count number of samples in lines and accumulate total number of samples for counted lines
    802e  locate next horizontal sync pulse
    802f   repeat determination, count and locate steps until either get minimum no. of full horizontal lines and skip remaining lines; if any or if no next horizontal sync pulse found, but a second vertical sync pulse is found then
    802g  set last full horizontal line before second vertical sync pulse as last line and
    802h  verify number of full horizontal lines is equal to minimum number of full horizontal lines
    802i   locate first horizontal sync pulse following second vertical sync pulse
    802j  determine if line is a full horizontal line; if not find next horizontal sync pulse
    802k  calculate number of lines in vertical sync pulse by dividing number of samples in sync pulse by number of samples per line
    802l   add calculated number of lines in vertical sync pulse to total line count
    802m  add number of samples in vertidcal sync pulse to total number of samples
    802n  do for all samples until last full horizontal line is completed

| set number of output pixels to equal product of output pixel clocks per line and number of lines | ~803 |

| set samples per line equal to number of samples divided by number of lines | ~804 |

| set phase offset equal to (remainder of number of samples divided by number of lines) times output pixel clocks per line | ~805 |

| set full horizontal line length equal to number of samples per line plus phase offset | ~806 |

| locate active video area | ~807 |

807a  determine active video window
        i   set height of windows to rows covered by full horizontal lines
        ii  set width to number of pixel clocks per line reduced by a horizontal sync pulse and a clamp length (both in output pixels)
        iii  locate first full horizontal line
        Iiv  shift window location

Fig. 6B1 v  if interlaced locate active video in next field and shift window location

| align phase | 808 |
|---|---|

808a position small window (100 output pixels x 20 columns) over high contrast area
808b initialize phase to zero
808c resample windowed area with assumed phase
808d calculate contrast measurement for resampled area $$\text{calculate } \sum_M \sum_N (P_{M,N} - P_{M,N+1})^2,$$

where $M$ indexes through rows, $N$ indexes through columns and $P_{M,N}$ is a pixel ( or sample?)

808e increment assumed phase by <u>desired subsample resolution</u> typically 1/10 of a pixel
808f repeat resampling, calculating, and incrementing steps until entire range of a pixel is searched
808g select phase with minimum contrast measurement and shift by 180 degrees or select phase with maximum contrast

| resample image | 809 |
|---|---|

809a position line resampling point to the first sample in the active video window
809b set current phase to phase from phase align step
809c resample current line
809d advance resampling point and phase by full horizontal line length
809e repeat resample and advance steps until all lines in active video window have been resampled

Fig. 6B2

| resample line | 810 |
|---|---|

810a establish resampling point as the line resampling point of image resampling step
    810b establish current phase as the phase in the resample image step
    810c set remaining phase equal to number of output pixels minus current phase
    810d determine next output pixel from $$[(\text{current sample}) \times (\text{remaining phase}) + (\text{next sample}) \times (\text{current phase})] \div (\text{number of output pixels} - 1)$$

810e calculate new phase offset as phase offset plus number of samples
    810f subtract number of output pixels from the phase offset
    810g increment resampling point
    810h repeat subtracting and incrementing step until phase offset < number of output pixels

Fig. 6B3

METHOD AND APPARATUS FOR CAPTURING VIDEO IMAGES

BACKGROUND OF THE INVENTION

This invention relates to acquiring images from an imaging source or device, and more particularly, relates to acquiring video images from various imaging sources or devices that employ different video formats.

While broadcast video transmission has standardized around the NTSC standards, in other areas multiple video standards or formats are employed, such as computer video displays (CGA, EGA, VGA, etc.) and medical systems (CAT scanners, NMRI systems, ultrasound systems, etc.). For these other areas, each video system (or format) is characterized by a video parameter file sheet that identifies the relevant video parameters that describe the video format, such as start sync pulses, front/back porch duration, line length, vertical timing, etc.

Because these video formats are not standardized, and new formats continue to be developed, interfacing peripheral add-ons from third party vendors is a difficult problem. As an example, a Photophone freezeframe video transmission system is coupled to a medical imaging device such as a CAT scanner and the Photophone captures still-video CAT scan images for transmission to remote facilities over telephone lines. Although the Photophone can operate with an NTSC format, it requires a video interface unit to convert the CAT scan images to the Photophone's display format, which is non-standard.

The current Photophone video interface technique uses an Adaptive Video multi-rate capture unit with a patented scan rate conversion technique based on a phase locked loop. The Adaptive Video interface is a hardware unit that is configured using the video format parameters for both the input and output video devices; for the example, the CAT scanner and the Photophone are the input and output devices, respectively. That is, configuring the Adaptive Video interface requires a video parameter file sheet. This sheet may or may not be available from the medical imaging device vendor, and once compiled may change if the vendor then later changes or modifies (upgrades) the video format.

That is, the Adaptive Video device acquires an image by employing a phase locked loop that is setup (via the input parameter file sheet) to be matched to the incoming video signal's frequency and sync pulses. The device then takes this input video and resamples it to achieve the desired output video signal. This requires converting the input signal parameters to the parameters of the desired output signal (which are again known via the output parameter file sheet). However, if the parameter file sheets are unavailable, or are not correct, then the viability of this approach deteriorates.

U.S. Pat. Nos. 5,019,899 and 4,743,958 relate generally to capturing video signals and using synchronizing circuitry to correctly capture a video signal. U.S. Pat. No. 4,970,581 relates to a color field sequence detector that employs a clock that is locked to the horizontal sync without using a phase locked loop means.

U.S. Pat. Nos. 4,893,319, 4,595,953 and 4,847,678 generally relate to colorburst synchronization by a phase locked loop means. U.S. Pat. Nos. 4,943,857, 4,942,468, 4,887,279, 4,864,359, and 4,736,238 generally relate to synchronization analysis by means other than a phase locked loop.

Thus, there are still problems when acquiring video signals from an imaging device. That is, a large amount of complicated hardware is required to be able to acquire video signals having different formats. Accordingly, there is still a need for simple and reliable hardware to acquire video signals having different formats.

These and other limitations and disadvantages of the prior art are overcome by the present invention, however, and methods and apparatus are provided for acquiring video images from video imaging devices having different video formats.

SUMMARY OF THE INVENTION

The present invention provides method and apparatus for acquiring video signals having different video formats, determining those formats and their associated parameters, and then optionally converting the video signals to a preselected format. In a preferred embodiment of the present invention a simple and reliable apparatus receives an incoming video image signal, samples it asynchronously using a stable (crystal oscillator) time base dock, and then processes the signal to recover the video image, including video format and associated parameters, for conversion into a preselected video format. The methods of the present invention first asynchronously sample or digitize the video signal to reconstruct the frequency of the video signal, i.e., to recover the video format and then determine the video signal pixel clock rate via a contrast optimization process. The resulting video signal and format parameters then allow for any type of desired reconstruction of the video data, i.e. conversion to different video formats.

It is an object of the present invention to provide a simple and reliable apparatus for acquiring video signals having different video formats.

It is an object of the present invention to provide simple and reliable methods for acquiring video signals having different video formats.

It is an object of the present invention to provide apparatus for acquiring video signals having different video formats and converting the acquired signals to a preselected video format.

It is an object of the present invention to provide methods for acquiring video signals having different video formats and converting the acquired signals to a preselected video format.

It is an object of the present invention to provide a video image capture system that does not require prior knowledge of the video format parameters for the incoming video signal.

Accordingly, these and other objects/features and advantages of the present invention will become apparent from the following detailed description, wherein reference is made to the Figures in the accompanying drawings.

BRIEF DESCRIPTION OF THE DRAWINGS

FIG. 5' depicts a functional block diagram of the presently preferred apparatus of the present invention.

FIGS. 6A1, 6A2, 6A3, 6B1, 6B2, and 6B3 depict flow charts of the major steps of the methods of the present invention.

DETAILED DESCRIPTION OF THE INVENTION

Figure 1:
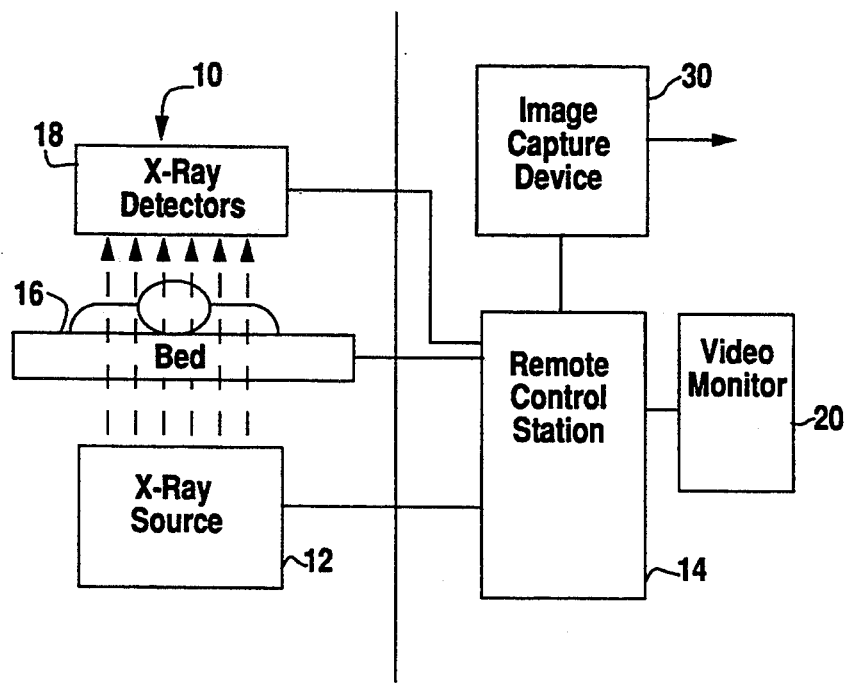
FIG. 1 depicts an imaging device and an image capture device of the present invention.

Referring now to FIG. 1 there may be seen an X-ray imaging device 10 which may be static, or rotate about an axis with its detectors to form a CAT scanner (not depicted). In brief, the X-ray imaging device 10 has a source 12 of X-rays whose intensity is controlled by a shielded or physically remote control station 14. The X-rays pass through the body 16 to be examined, after which they are appropriately detected and amplified by an appropriate detector array and detector circuitry 18. The signals may be further processed in the control station 14 and then may be displayed on a CRT or video monitor 20. An image capture device 30 of the present invention is also depicted as receiving the video signals sent to the CRT or video monitor 20 representing the resulting X-ray image.

The image capture device 30 may then process the video signals to determine their video format and associated parameters and convert the signals to a digital form for transmission to other devices suitable for storing these video images, or for transmitting these video images to other physical locations, such as for example by means of telephone lines.

Although an X-ray imaging device 10 is depicted in FIG. 1, other types of imaging devices 10, such as for example, but not limited to, MRI devices or ultrasound devices, may be employed to supply video signals to the image capture device 30 of the present invention.

Figure 2:
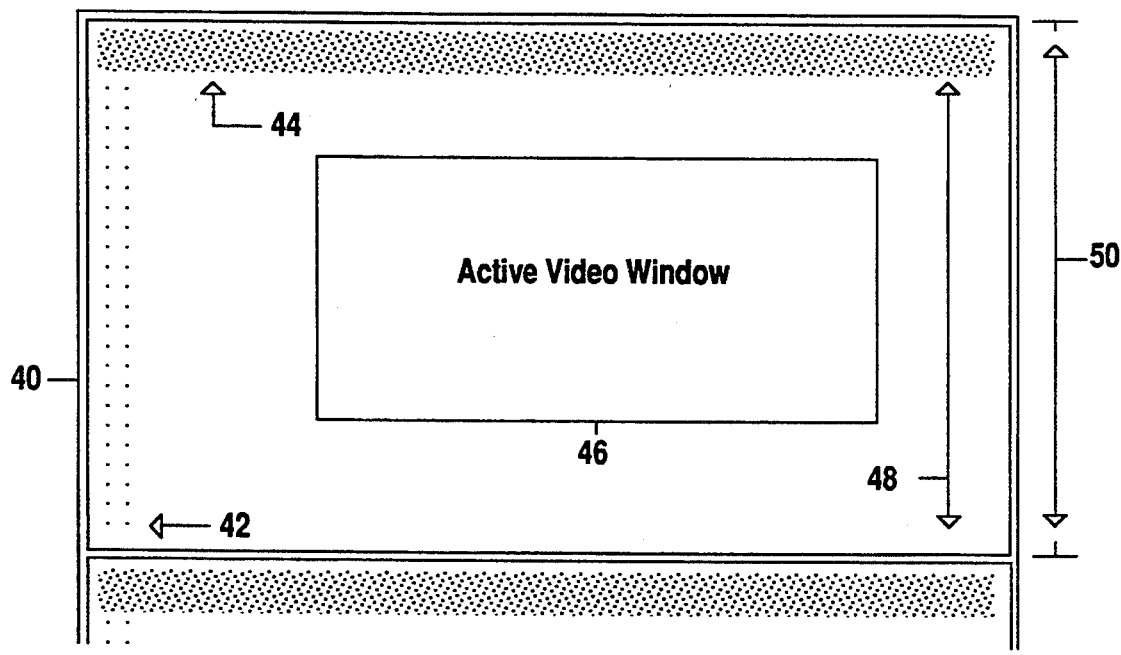
FIG. 2 depicts the general format of a video signal from a video imaging device.

Referring now to FIG. 2, there may be seen a general format 40 of a video signal from a video imaging device 10, arranged as seen on a CRT 20, including various horizontal 42 and vertical 44 synchronization information, i.e. sync pulse information, not normally seen by a viewer (or user). More particularly, it may be seen that there is an active video window 46 depicted which typically contains the information in which a viewer is interested. In addition, there may be seen a depiction of the number of full horizontal lines 48 in a frame of video signals. Further, a depiction of the number of lines per field 50 is also illustrated in FIG. 2. A portion of the next frame or field is depicted below the entire frame 40 depicted in FIG. 2.

Figure 3:
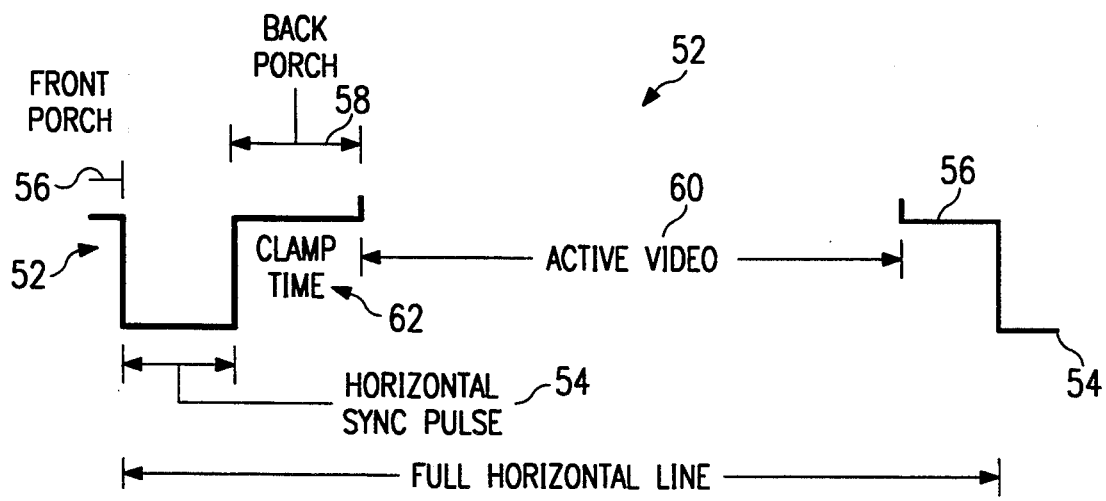
FIG. 3 depicts an illustrative full horizontal line depicted in FIG. 1.

FIG. 3 illustrates a full horizontal line 52 and its associated timing for a video signal such as the frame depicted in FIG. 2, including the horizontal video synchronization pulse 54 (or horizontal sync pulse) with its associated front 56 and back 58 porches, together with an active video signal 60. The conventional video interface approach represented by the Active Video interface requires that the various video parameters associated with the video signal be supplied, including sync pulse alignment and frequency matching (by using a phase locked loop), so that the interface unit can be synchronized to the incoming video signal and then perform a video format conversion. From FIG. 3 it may be seen that a full horizontal line starts at the leading edge of a horizontal sync pulse 54 and ends at the leading edge of the next horizontal sync pulse 54, and includes an active video signal 60 between various portions of timing information, one of which is the clamp time 62.

The presently preferred apparatus of the present invention receives and samples or digitizes an incoming video image signal asynchronously using a stable (crystal oscillator) time base clock, and then processes the signal to recover the video image, including video format and associated parameters, for conversion into a digital form for later conversion into a preselected video format by components other than part of the present invention. The methods of the present invention first asynchronously sample or digitize the video signal to reconstruct the frequency of the video signal, i.e., recovers sync pulse information and then determines the video signal pixel clock rate via a contrast optimization process. The resulting video signal and format parameters then allow for any type of desired reconstruction of the video data, i.e. conversion to different video formats.

In this broad aspect of the invention, it is assumed that the number of pixel clock pulses in each video line (i.e., the number of pixels in the active video frame in FIG. 3) is known. If not, another aspect of the present invention involves processing the video signal iteratively using a range of possible pixel clock values and then comparing calculated contrast values associated with various iterations to recover the actual pixel clock rate based on a contrast optimization analysis.

Figure 4:
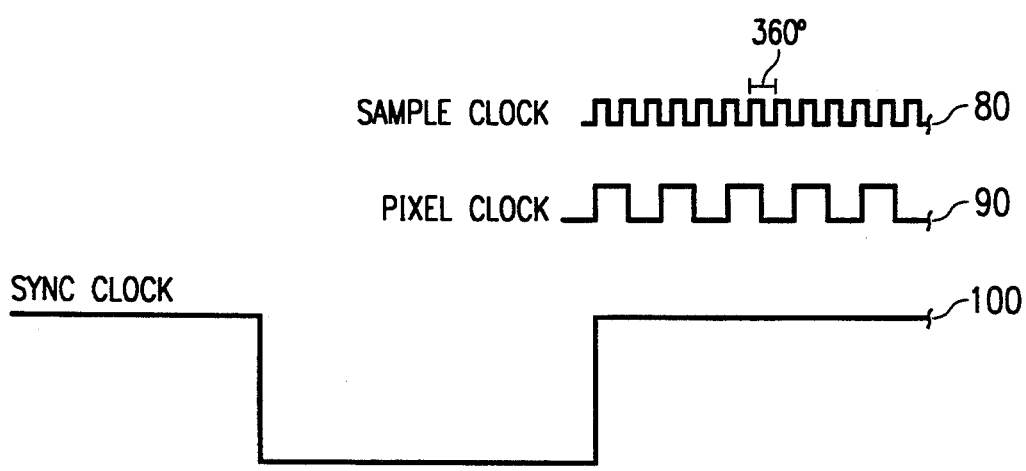
FIG. 4 depicts a digitization clock rate of the present invention compared to a portion of a video signal.

In more detail, the sampling or digitization of the video signal involves the following. Referring now to FIG. 4, the asynchronous time based clock 80 of the present invention operates at a significantly higher frequency than conventional video pixel clocks 90, enabling the apparatus and methods of the present invention to capture the video sync pulses 100 of a video image with sufficient sample resolution to enable the apparatus and methods of the present invention to synchronize to the pixel clock 90 of the video signal. In addition, the phase calculations employed by the methods of the present invention generally define the phase between leading edges of adjacent pulses of the sample clock or pixel clock to be 360 degrees of phase.

The phase alignment to pixel clock involves the following. In contrast to the phase locked loop approach of phase synchronizing to the video sync pulses, the apparatus and methods of the present invention rely on synchronizing, via a contrast optimization process, to the pixel clock of the video image. This allows optimal reconstruction of the video image from the digitized video image signal, thereby optimizing video format conversion.

The determination of the number of pixel clock pulses involves the following. Ordinarily, the pixel clock parameter is readily available. However, if it is not, an iterative version of the contrast optimization process is used to produce a series of contrast values for a range of possible pixel clock values. The contrast values are compared to find the optimum or maximum contrast, which is achieved for the correct pixel clock pulse value of the digitized video signal.

Figure 5:
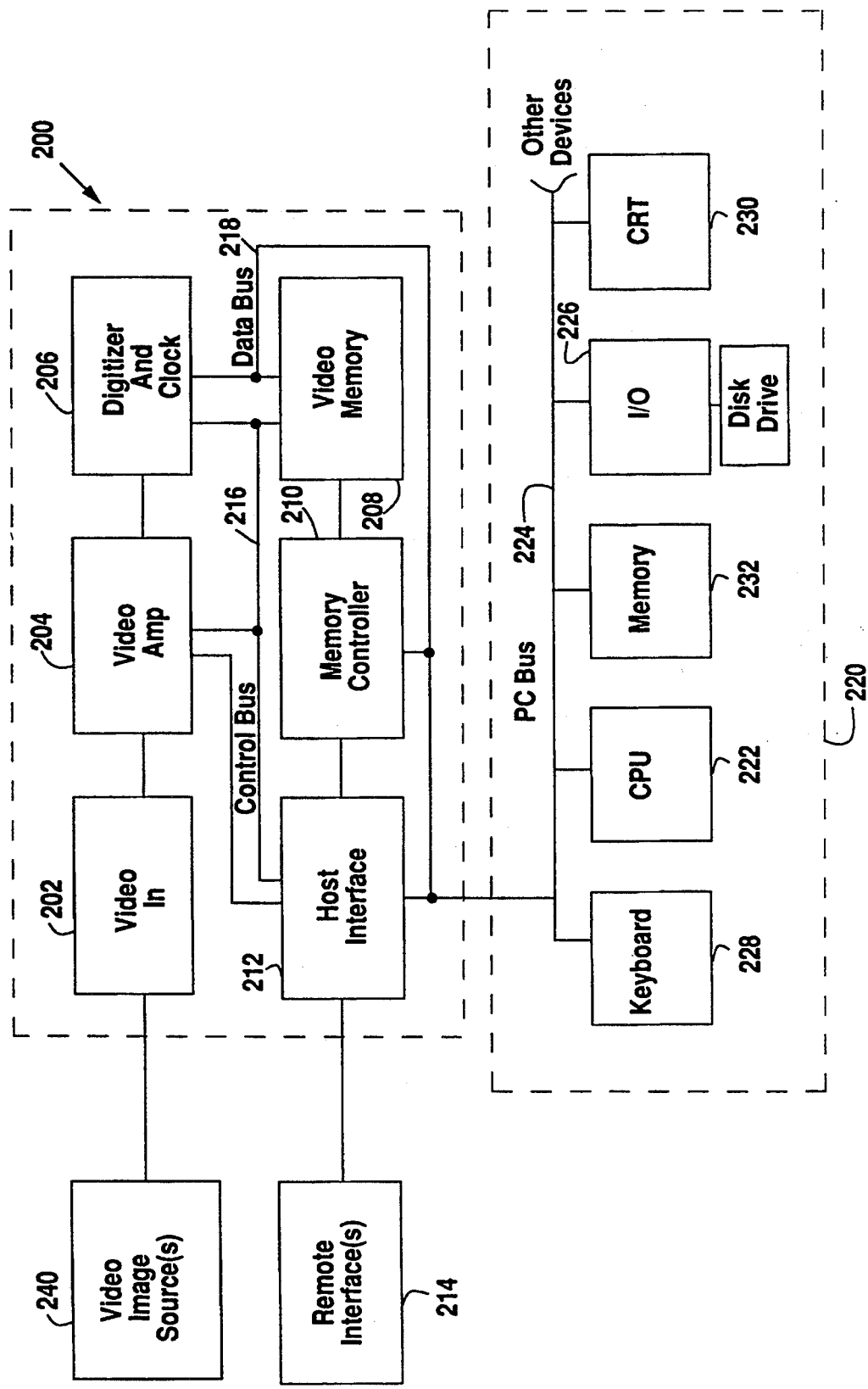
FIG. 5 depicts a basic block diagram of the presently preferred apparatus of the present invention in a PC and their interconnections.
Figure 5:
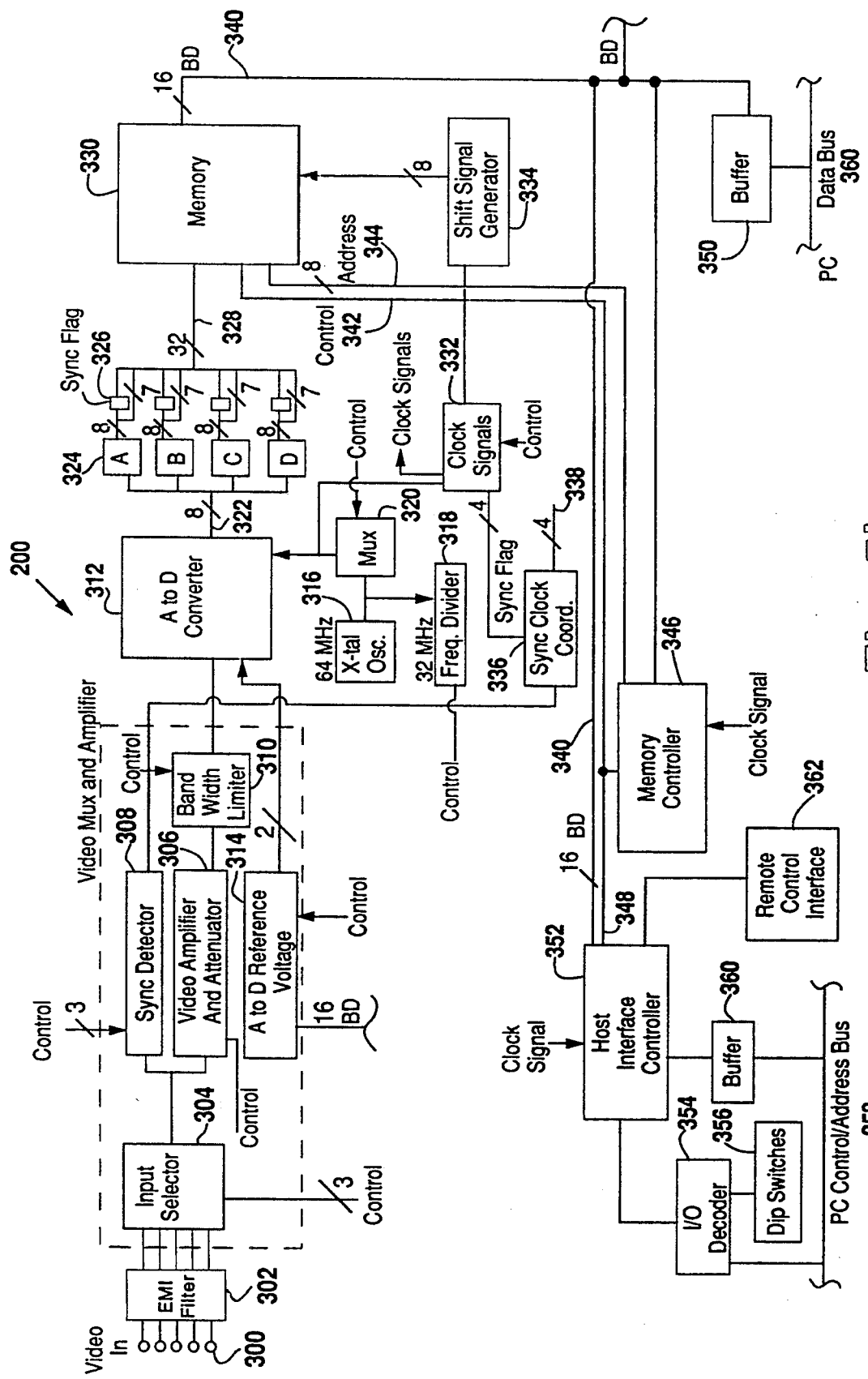

Referring now to FIG. 5, there may be seen a presently preferred embodiment of the apparatus of the present invention. More particularly, it may be seen that the apparatus of the present invention is a plug-in board 200 suitable for use with a personal computer (PC) 220 or Photophone. That is, the plug-in board 200 is a single PC/XT size card.

This card 200 contains a video-in block 202 for selecting which video channel is to be analyzed. The output from the video-in block 202 is passed to a video amplifier block 204 where it is appropriately conditioned and/or amplified via a programmable video input attenuator that allows for up to 3 volt video levels. A video sync capture circuit in the video amplifier block 204 marks a sync pulse by setting the high bit of a sample when video voltage falls below the sync slice level, as noted later herein. The signals from the video amplifier block 204 are passed to a programmable digitizer and clock block 206 where the actual analog video signal is digitized. The clock rate is based upon a highly stable crystal controlled clock. The digitization rate may be selected to be either 64 or 32 Megahertz (MHz).

The digitized analog signal is then provided to a video memory 208. The video memory 208 is a random access memory (ram) that allows for up to 2 million samples of video with 8 bits per sample. Other numbers of bits per sample may be employed in the present invention. That is, at a digitization rate of 64 MHz, the memory 208 allows for collection of up to 32.8 milliseconds of samples. For the digitization rate of 32 MHz, the memory 208 allows for collection of up to 65.5 milliseconds worth of video signals. The video memory 208 is in turn controlled by a memory controller block 210. The memory controller block 208 in turn is interconnected with a host interface block 212.

The host interface block 212 interconnects with the bus 222 of the PC 220 into which the card 200 has been inserted. In addition, a "remote control" or remote interface block 214 is depicted as also being connected to the host interface 212. This remote control 214 allows for remote control of the card 200 via this remote interface block 214, as described more fully later herein. In addition, it may be seen that the host interface 212 also provides control signals, via a control bus 216, to the video amplifier block 204, digitizer and clock block 206, memory controller block 210 and memory 208. A data bus 218 is also depicted. Preferably, the host interface 212 and the card require 16 data bits for interfacing with the PC 220. That is, the presently preferred card requires a 16 bit slot in an IBM AT compatible computer and will operate at bus speeds up to and including 10 MHz. However, the data bus may be appropriately modified to employ either 8 or 32 bits for data. In addition, the host interface 212 may be appropriately modified for varying bus clock rates, such as for 10 MHz bus operations, or for higher (or lower) bus operating speeds.

The video memory 208 is preferably organized into a single 8 bit plane of $2 \times 1024 \times 1024$ samples of video memory. The term "sample" is used herein to differentiate it from a pixel (picture element) which must be reconstructed from more than one sample.

Thus, it may be seen that the board 200 of the present invention has the following major components. The initial component is a programmable digitization and clock block 206 which allows for digitizing an incoming video signal at a plurality of different sampling or clock frequencies, as well as allowing for variations in a signal's digitization levels associated with the digitization process, i.e. generally, whether a signal's level is above a digitization level and digitized as the amount of signal above that level, or below that level and not digitized at all as if no signal were present; that is, the white, black and sync slice values, described later herein, may be adjusted to preselected levels based upon the data acquisition format and as a function of the actual signal voltages found in the video signal. In addition, there is a video memory component 208, that is preferably 2 megabytes of ram that allows for the acquisition of approximately 2 million digitized video samples. More or less memory 208 may be so employed in the present invention. Further, there is a programmable video input amplifier/attenuator component 204 which allows for capture of video signals having a wide range of signal voltages. More particularly, the attenuator may be used to allow for the capture of video signals of up to about 3 volts and the amplifier portion may be used for boosting the voltage level of low voltage video signals. Again, the programmable signal digitization levels in the digitization process allow for variations in setting of the white, black and sync slice levels. These blocks allow for the automatic determination of input voltage levels of a video signal and appropriate digitization of this video signal. A video synchronization capture circuit is also provided which may be employed to mark detection of synchronization pulses, by setting the high bit of the sample corresponding to the video signal when the video signal voltage falls below an adjustable but preset sync slice level. In addition, the host interface component 212, video memory controller component 210, and remote interface component 214 control various operational aspects of the foregoing components.

As may also be seen from FIG. 5 the PC 220 includes a CPU 222 and associated memory as well as a CRT and keyboard. As noted in the figure there may be other boards and/or devices connected to the PC bus 224. In addition, it may be seen that the PC 220 has an input-/output device 226, such as a disk drive suitable for receiving a disk containing programs and/or data. Also depicted are image sources 240 which are connected to the video-in block 202 component of the board 200, as well as the remote interfaces 214 which interface with the host interface component 212 via a separate line. The details of the connections to the host interface 212 are described later herein. The PC may also contain a keyboard 228 and display 230, as well as memory 232.

Thus, the board of the present invention may be installed in a PC or Photophone (which is a PC) and then appropriately connected to a remote interface device and an image source which allows a user to selectively capture images associated with the image source. A plurality of image sources may be connected to the back of the board via video-in ports and a plurality of remote interface devices may be connected to interface connections on the back of the board. Preferably, there is a one-to-one correspondence between a particular image source and a remote interface, i.e. a "channel". The board as installed in the PC has appropriate dip switches associated with its PC bus address, so that the CPU knows where on the PC bus to send programs, program instructions, data to the board or to receive such items from the board. After this has been accomplished, the user may then load the programs associated with the board into the memory of the PC. Preferably this memory is a nonvolatile memory such as a "hard disk". However, it is also possible to run the board based on programs that are stored on a disk that is then inserted into a disk drive associated with the PC containing the board.

The operating programs that are loaded into the PC (or are maintained on a separate disk) are employed to set up or calibrate the board and employ the methods of the present invention to acquire video signals from an imaging source. In addition, once a specific channel associated with a specific image source has been calibrated or set up, these programs store the resulting calibration data in a nonvolatile memory location associated with the specific channel and/or device so that it may be recovered after the PC is shut down. In this manner, the basic video format data for a channel or specific image source is stored such that the PC containing the board, upon power up, reloads the associated calibration video format data into the appropriate registers and systems of the board when that channel is employed.

In general, the main programs associated with the video capture aspects of the present invention are displayed in a main menu that appears on the screen when the directory containing the programs are called by the PC user. The main menu allows for the set up of the card by determining the video parameters for a specific channel of an image source, acquisition of video signals from such an image source, storage of such video images by the PC, and transferring video data from such video image devices or sources to other devices, via either local area network connections or via modems over telephone lines. In addition, there are associated utility programs associated with maintenance of the data and programs themselves.

By way of example, but not by way of limitation, the user may install the board in a PC, connect it to an appropriate video image source and a remote interface device (associated with that video image source). The user may then download the operating programs from a disk onto a hard disk of the PC and call up the main menu which then allows the user to perform a set up and calibration routine for the video image source.

More particularly, the remote interface device includes two status LEDs and at least one push-button switch which indicates that the user desires to capture and/or record a video image being generated by the video image source. That is, the depression of the acquire data button on the remote interface device signals to the host interface block of the board that the user desires to acquire video signals from the designated video image source.

After the user presses the acquire data button on the remote interface, the board will begin sampling the video signal from the video image source that is associated with that remote interface. More particularly, the board as presently preferred can accommodate up to five remote interfaces and five video image sources. There may be a selector switch which the user of the PC may use to select one of these five channels. However, preferably, all five channels have access to the video-in portion of the board and once a remote interface button is pressed for that channel it generates via the host interface, the CPU and the programs in the memory of the PC, appropriate signals to the video-in block to select that channel (assuming that no other channel is employed to acquire signals—in which case a "busy" signal is sent to the remote interface). After that channel has been selected, the board will then load the data associated with the video signals and format from that video image source, if the set up and calibration routine has already been performed. If this routine has not been performed, then the set up and calibration routine must be performed to establish the basic video format and parameters associated with that video image source. The detailed steps associated with the set up or calibration routine and data acquisition routine are described later herein.

In general, the card is designed to be compatible with a Photophone work station or an IBM AT/286 or more powerful PC system. The board preferably includes five 75 ohm composite video ports that employ a standard female DB-15 connector. The board accepts a video bandwidth of up to 100 MHz. There are two RJ45 control ports for connection of up to two remote controls, each preferably with two actuator buttons ("send" and "save") and two LED indicators ("ready" and "busy"). The "send" button transmits captured images to another Photophone and the "save" button captures an image. However, this can be expanded to up to five remote controls with an RJ45 splitter.

Referring now to FIG. 5' there may be seen a basic functional block diagram of the major components of the presently preferred board 200 of the present invention. More particularly, it may be seen that the video-in signals enter the board 200, via input plugs 300, pass through an Electro-magnetic Interference (EMI) filter 302 and then pass through an input selector 304, which may be a series of serially connected relays that enable selection of the desired channel of the video signals. However, only one video signal may be sampled at a time. The relays associated with the input selector block 304 are controlled by control signals from the host interface controller block 352. The selected channel of video signals is then split and passed to a video amplifier and attenuation block 306, as well as to a sync detector block 308.

The sync detector block 308 is connected to control lines from the host interface controller 352; these control lines have signals that are preferably "bits" set in a register (not depicted) in the host interface controller 352. The bits identify the sync slice voltage level below which the sync detector 308 indicates that a sync pulse has been detected. Preferably, the registers in the host interface controller 352 associated with the sync detector 308 may be loaded based on data from previous calibrations or set ups, or may be assigned a default value for set up and calibration, as discussed later herein.

The video amplifier and attenuator block 306 takes the filtered selected video signal and either amplifies and/or attenuates it based on control signals received from the host interface controller 352. For the initial set up procedure the output voltage from the video amplifier and attenuator is selected to attenuate the input video signal voltage the maximum amount. This is then later adjusted as part of the set up procedure. That is, absent some stored data indicating that it should be otherwise set, control signals set the attenuation to the maximum attenuation level. The output from the video amplifier and attenuator block 306 is in turn fed to a bandwidth limiter block 310.

The bandwidth limiter block 310 is also controlled by the host interface controller 352 and may be selectively employed to reduce the bandwidth of the video signal from 100 Mhz to some lower bandwidth and accordingly reject any high frequency noise, often associated with some older style of video signals.

The video signal from the bandwidth limiter 310 is then passed to the analog to digital (A to D) converter block 312. There is an analog to digital reference voltage generation block 314, which preferably generates two "reference" voltages for the A to D converter 312, also associated with the amplifier and attenuator block. These reference voltages may be programmed to be a plurality of preselected voltages within a fixed range. Again the selection of the preselected voltage level is based on control signals from the host interface controller 352. The control signals are preferably a set of bits which are supplied to two digital to analog (D to A) converters to generate the required reference voltages. In general, the two voltages correspond to the maximum or white video level and the black or zero voltage level.

The A to D converter 312 takes the supplied video signal and digitizes it using the reference voltages supplied to it by the A to D reference voltage section 314. In addition to the A to D converter 312, a stable 64 MHz crystal oscillator 316 is also part of the digitizer and clock block. A 64 MHz clock signal is then supplied to a frequency divider 318 which reduces the 64 MHz clock signal to a 32 MHz clock signal. The decrease in the clock signal from 64 MHz to 32 MHz in the frequency divider 318 is also under the control of a control signal from the host interface controller 352. The 64 Mhz and 32 MHz clock signals are supplied to a clock multiplexer 320 which is also under the control of the host interface controller 352. In this manner, the host interface controller 352 selects, via the clock multiplexer 320, whether the 64 MHz clock signals or 32 MHz clock signals are supplied to the A to D converter 312, so that the video signals are digitized at either a 64 MHz clock rate or a 32 MHz clock rate. Other different frequencies may be so employed in the present invention to digitize the video signals. As noted later herein, for the set-up procedure the 32 MHz clock rate is employed.

8 bits of data representing a digitized sample (or a "data word") are output from the A to D converter 312 onto an 8 bit wide bus 322. This bus 322 in turn connects in parallel to a series of registers or buffers 324. These buffers 324 are temporary storage devices that allow for the high rate of data coming out of the A to D converter 312 to be slowed down to a more conventional bus frequency. It is presently preferred that four 8 bit wide buffers 324 be employed, however, any number of such buffers may be employed. For example, eight such buffers 324 may be employed in the present invention. The 4 buffers are sequenced in a cycle so that the first buffer takes the first data word, the second buffer takes the second data word, the third buffer takes the third data word and the fourth buffer takes the fourth data word at which time the first buffer then takes the fifth data word and so forth. Thus, the buffers can clock data in and out at one-fourth the speed of the A to D converter's data word output rate. In addition, the high bit coming out of each one of the buffers 324 is logically "or"ed, via a logic "or" circuit element 326, with a sync flag indicator 338, which comes indirectly from the sync detector 308. In this manner, the high bit may be set based upon the sync detector 308 detecting a sync pulse.

The outputs from the buffers 324 and the logic circuitry 326 associated with the high bits are then supplied to a 32 bit wide data bus 328 which is then supplied as an input to the memory block 330. In addition to supplying the digitization clock rate to the A to D converter 312, the clock multiplexer 320 also supplies this same signal to a clock generation block 332 which then supplies various clock signals at appropriate clock rates (generally one-fourth those of the A to D converter) to the other circuitry associated with the board. In addition, these clock signals are provided to a shift signal generator 334 which then supplies appropriate signals to the blocks of the memory 330 for shifting data into the memory 330 from the 32 bit data bus 328. In addition, the clock generation portion 332 is under the control of the host interface controller 352, as is the shift signal generator 334.

Further, the clock generation portion 332 also supplies a signal to four synchronization clock coordinator circuits 336. The output from the sync detector 308 is supplied in parallel to the sync clock coordinator circuits 336 to identify which sample clock pulse is associated with the detection of a synchronization pulse, i.e. the leading edge (or trailing edge) of the sync pulse. Each of the sync pulse clock coordination circuits 336 then appropriately generates a sync "flag" 338 upon detection of a sync pulse from the sync detector 308. As a result of this, the sync clock coordinator circuitry 336 generates a sync "flag"338 which is identified with one of the four circuits 336 associated with this coordination function. As noted before, the sync "flag" 338 is then logically "or"ed with the high bit coming out of the buffer 324 (that is the temporary storage for the data from the A to D converter). In this manner, detection of a sync pulse may be captured in the high bit associated with a particular data byte being sent to memory.

Preferably, the video memory 330 is arranged in an 4×4 block of memory chips with the overall storage capacity presently preferred to be 2 megabytes of ram. An output bus 340 for buffered data of 16 bits is also connected to the memory 330 to allow the data in the memory 330 to be read out and placed on to this bus 340. In addition, control 342 and address 344 signals are provided to the memory 330 from a memory controller block 346. The memory controller block 346 and the memory block 330 are interconnected to a control bus 348 which also connects with the host interface controller 352. In this manner, the host interface controller 352 may send appropriate control signals to either the memory controller 346 or the memory 330. In addition, the memory controller block 346 has a clock signal supplied to it from the clock generation block 332 of the clock circuitry. The 16 bit data bus 340 from the memory 330 is also connected to the memory controller 346 and, via an isolation buffer 350, to the data bus 360 of the PC 220. In this manner, data may be transferred to the PC 220 for analysis using the operating programs of the present invention, i.e. employing the methods of the present invention. The buffered data bus 340 also connects to the host interface controller 352.

The host interface controller block 352 also interfaces with an I/O decoder block 354 which has associated with it dip switches 356 which set the address on the PC bus 358 of the card of the present invention. In addition, there is an isolation buffer 360 between the host interface controller 352 and the PC control/address bus 358. The host interface controller 352 is also appropriately connected to the remote control interface devices 362. The host interface controller 352 preferably includes a plurality of registers of varying sizes or lengths that are associated with various control signals provided to other functional blocks on the board of the present invention. These registers may be loaded with previously determined data from the PC. In this manner, the host interface controller may use these registers to control the sync slice level associated with the sync detector and the channel that is selected via the input selector, as well as the A to D reference voltages supplied to the A to D converter by the A to D reference voltage blocks. In addition, the registers may also determine what digitization rate is to be employed by the digitizer, as well as other control functions.

Referring now to FIGS. 6A1, 6A2, 6A3, 6B1, 6B2 and 6B3 there may be seen a flow chart of the major steps of the methods of the present invention, as implemented in the operating programs of the present invention. More particularly, the methods of the present invention determine video parameters of video signals from an imaging device by analyzing a plurality of samples acquired from the imaging device. In general, the methods of the present invention may be broken into two major phases. The initial phase is the calibration or set up phase and is depicted in FIG. 6A. Once the video parameters of the video signals from an imaging device have been analyzed during the calibration phase, an acquisition phase, as depicted in FIG. 6B, may be then employed, which is the method for sampling the input image and converting it to a preselected digital video form. An input image is acquired as a continuous stream of samples containing the active video and the surrounding timing information.

While the number of input pixels in the input image will remain constant, the number of samples recorded during an image acquisition may vary slightly. This is due to drift in the hardware and the fact that the sampling process is asynchronous to the input video's pixel clock. Identifying the number of samples recorded during the time of an image capture is important to the quality of the resampled image, i.e. the desired output video format image. This is because it is the ratio of the number of samples acquired to the number of pixels used in the preselected or output video format, that maintains the accuracy of the resampling process.

It is assumed that the change in the number of samples per horizontal line due to drift is constant over a single capture time and accordingly any errors caused by hardware drift can be overcome by calculating the number of samples every time a video signal acquisition is made in the acquisition phase. That is, determining the number of samples occurs during both the calibration and acquisition phase.

Variations due to the asynchronous sampling process can amount to as much as one sample over an entire capture time. If the number of samples is calculated over the entire capture time, as an alternative to a single line or frame, the single sample error can be distributed over a very large area rather than being associated with a single line when it may cause pixel skew. That is, by using all the captured samples in the calculation of the number of samples per line, the calculated number of samples per horizontal line value is more accurate.

The number of samples is calculated by locating the maximum number of contiguous complete horizontal lines during an acquisition and counting the number of samples in this area. Then the number of pixels is adjusted with respect to the number of input horizontal lines found.

A video signal may be digitized and stored in one of the three following data acquisition formats: 1) sync pulse indicator information only, 2) active video and sync information, and 3) active video and sync pulse indicator information. The different formats enable or disable the sync pulse indicator circuit and vary the settings of the white and black levels. The white and black levels identify the voltage range of the video signal that is digitized and represent the gray levels in the video signal as digitized numeric values between 255 and 0. If the sync pulse indicator circuit is enabled, the high bit of each sample is set when the sample is digitized and the voltage level is below the sync slice level.

As depicted in FIG. 6A1, 6A2, and 6A3 the main steps of the set up phase are to determine the horizontal line parameters 701, determine the video signal voltage levels 702, determine the video signal format parameters 703, determine the number of lines per field 704, determine the number of input pixel clock pulses per horizontal line 705, determine the optimum sample rate 706, determine the active video window 707, and store the data and parameters set or determined by the preceding steps 708.

Determining the horizontal line parameters 701 initially requires only sync pulse indicator information. That is, the acquisition format is the sync pulse indicator information only. Due to the fact that the active video may also set the high bit in some samples, the active video is preferably masked out. This is accomplished by the following steps: 1) the sync pulse indicator circuitry is enabled (i.e., turned on) 701a, 2) the black and white levels are set above the peak active video level 701b, 3) the sync slice level is set to its minimum level 701c, and 4) a burst of new samples 701e are acquired with the actual number of samples acquired being determined by the digitization rate employed. Alternatively, the first three steps may summarized as setting the digitization signal levels to only acquire sync pulses. Preferably, the initial acquisition rate is 32 MHz until an optimum sample rate is determined, as noted later herein. The new samples are acquired but only the sync flag indicators are represented in the stored data. That is, only sync pulse indicator information is acquired, i.e. the data acquisition format is so selected.

Figure 7A:
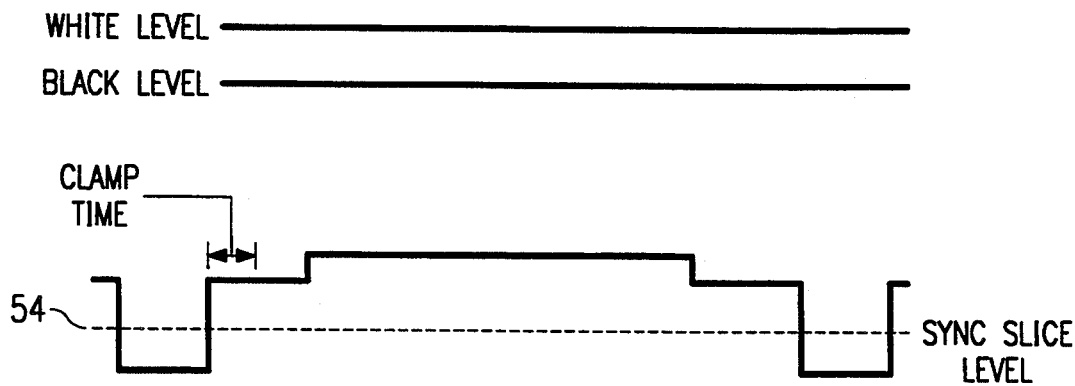
FIGS. 7A and B depict various adjustable parameters employed by the present invention to acquire a selected portion of video signals and the resulting signal, respectively.
Figure 7B:
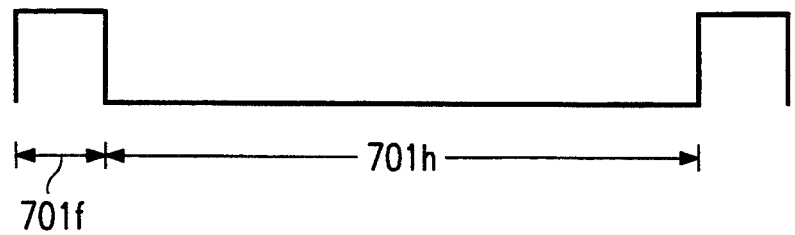

This may be seen by referring to FIG. 7A, wherein the white and black levels are both depicted as being above the active video portion of the video frame and wherein a programmable sync slice level has been set near the bottom of the allowed voltage range. Acquiring signals through the programmable digitizer with this signal setup provides the resulting signal seen in FIG. 7B. That is, once the voltage level drops below the sync slice level, the data is stored with a set high bit, until the voltage returns above the sync slice level. In this manner, the horizontal sync pulses shown in FIG. 3 are collected with no interfering active video signals. The stored data is the serially "read" from the first stored to the last stored by the CPU of the PC to determine the start and stop of a sync pulse, its duration (in samples), and the duration (in samples) between sync pulses. The horizontal sync pulse length is determined by constructing a histogram of all the detected and stored sync pulse lengths and then selecting the most common sync pulse length from the histogram as the horizontal sync pulse length 701f. The horizontal line length is determined by constructing a histogram of all the line lengths (durations between sync pulses) and then selecting the line length which is the most common from the histogram to be the horizontal line length 701*h*. These lengths can then be converted into times.

After the histograms of the sync pulse lengths and the line lengths have been prepared and the most common lengths selected as the horizontal sync pulse length and the horizontal line length, these values are then stored and used in subsequent steps. That is, the horizontal sync pulse length is set equal to the most common sync pulse length from the histogram. An acquired trigger count, which is equal to 2 times this horizontal sync pulse length, is then set 701*g*. The samples per line is then set from the histogram as the most common number of samples between consecutive horizontal sync pulses, i.e. the horizontal line length. Then a determination is made of the clamp time 701*i*. The clamp time is normally allocated the same amount of time as the horizontal sync pulse. However this may cause problems on some video formats during the vertical blanking period. Therefore, the clamp time is set to the smaller of the horizontal sync pulse time or a value generated by a linear function based on the full horizontal line length. This function returns the minimum amount of time required by the clamp circuit to stabilize the video input signal.

The samples per fine value is actually the approximate number of samples for a full horizontal line. A full horizontal line is a consecutive set of samples that begin with a horizontal sync pulse and contains a total number of samples which are measured from the same pulse leading edge to the following sync pulse leading edge, while being within some tolerance factor (typically 10%) of the samples per line value set above.

The acquired trigger count determines when the acquisition hardware will actually start capturing samples. It specifies the number of consecutive samples required below the sync slice level before an acquisition can begin. The image acquisition process operates best if the acquisition begins during a vertical blanking period. This ensures that at least a frame of video signals is acquired. Therefore, the acquired trigger count is set to 2 times the horizontal sync pulse length.

The clamp time is the amount of time given to the DC restore circuit to compensate for any drift in the input voltage level. This adjustment starts after the rising edge of a sync pulse. If the clamp time is too short the voltage level will start to drift. If the value is too large it will run into the active video or the low portion of the vertical sync pulse and the voltage level will shift. Therefore, the clamp time is set to the minimum of the horizontal sync pulse time or a time based on the horizontal line length. These determined or set values are saved and stored.

Thus, in summary, the following steps are performed to determine the proper amount of clamp time. The white and black levels are set above any input video level 701*b*. The sync slice level is set to the minimum value 701*c*. The clamp length is set to a minimum value 701*d*. The video sync pulse indicator circuitry is activated 701*a*. A video image is acquired 701*e*. The horizontal sync pulse length is determined 701*f*. The horizontal line length is determined 701*h* and the clamp time is selected based upon either the horizontal sync pulse length or a time based on the horizontal line length 701*i*. Once the required clamp time has been determined, the video signal voltage levels are determined 702.

Figure 8:
FIG. 8 depicts various adjustable parameters employed by the present invention to acquire video signals.

FIG. 8 depicts the normal settings for the various video levels for the programmable digitizer employed in the present invention. The white level is the signal voltage level that produces the maximum gray value during an acquisition. Any signal voltage level above that white level will also produce the maximum gray value. The black level is the signal voltage level that produces the minimum gray value during an acquisition. Any signal voltage below the black level will also produce the minimum gray value. Any signal voltage level below the sync slice level results in the setting of the high bit in the corresponding sample when the sync pulse indicator circuit is active.

The following steps are performed to determine the input video's signal voltage levels 702. The white level is set to its maximum value 702*b*. The black level is set to its minimum value 702*c*; this value is below the sync tip level. The video sync pulse indicator circuitry is deactivated 702*a* and a video image is acquired 702*d*. These steps will result in stored data samples containing sync pulse, clamp, and active video information. That is, the acquisition format is the active video and sync information. At this point the input samples are searched by the CPU of the PC for maximum and minimum voltage values 702*e* and then the following levels are then set. The white level is set to the signal voltage level that relates to the maximum gray value found in the data samples 702*f*. The black level is set to zero volts 702*g*. The sync tip level is set to the signal voltage level that relates to the minimum gray value found in the data samples 702*h*. The sync slice level is set to half (or some other fixed value) of the distance from the sync tip level to the black level 702*i*.

Thus, in summary, to determine the video level settings 702 the entire video signal range from sync tip to peak active video is digitized. This is accomplished by disabling the sync pulse indicator circuitry 702*a* and setting the white level above the active video 702*b* and the black level below the sync tip level 702*c*. New samples are then acquired and 702*d* depending upon the signal voltage levels found in those samples the white, black and sync tip level, as well as sync slice level, are adjusted 702*c*–702*i*. After the video signal voltage levels have been determined and set, the next step is to determine the video signal format parameters.

The following three "definitions" are used to assist in determining the format of the input video signal. The vertical sync pulse is defined as a contiguous block of sync pulse indicators at least twice as long as the horizontal sync pulse length 703*a*. The horizontal sync pulse is defined as a contiguous block of sync pulse indicators less than twice the horizontal sync pulse length 703*a*. A full horizontal line must begin with a horizontal sync pulse and be within a percentage (approximately 10%) of the previously set horizontal line length 703*a*. The full horizontal line length is specified in such a way as to avoid confusion with the various synchronization schemes used during a vertical blanking period.

The captured video signal is considered interlaced 703*b* if one of two consecutive fields is determined to be the second field of an image. If interlaced, the second field has an integral number of lines plus a half a line from the first vertical sync pulse to the first full horizontal line.

The number of lines per field is the integral number of lines from the first vertical sync pulse in a field to the first vertical sync pulse in the next field. The number of lines per field is determined 704 by locating the first full horizontal line in a field 704*a* and then locating the last full horizontal line in the field 704*b*. The minimum number of full horizontal lines is then set equal to the number of full horizontal lines from and including the first to and including the last line previously located 704c. The line count value is then set to the minimum number of full horizontal lines 704d. The first full horizontal line in the next field is located 704e. An accumulated total line count is then set to the old line count value to which are added the number full horizontal lines from the last line of the previous field to the first line of the current second field 704f. If the video is interlaced, the above is repeated for the next field and then the smaller of the two minimum number of full horizontal lines values is selected and the line count is set to the sum of the first and second field counts divided by two 704g.

The number of pixel clocks per line 705 is initially assigned a value as follows. The pixel clocks per line is equal to four divided by three times the number of lines per image 705a. The lines per image is equal to the lines per field if non-interlaced, or the lines per image is equal to two times the lines per field if interlaced. This value is then adjusted with a method very similar to the phase alignment process, but the pixel clocks per line value is allowed to vary.

The following steps outline this process. The initial pixel clocks per line value and the active video window from the determine active video window step (discussed later herein) are used to provide a video image to the user on the PC's display. The user then places a window over a high contrast area 705b. Preferably, text is selected as a high contrast area. The phase is initialized to zero 705c. The area in the window is resampled with the assumed phase and pixel clocks per line 705d. A contrast measurement is calculated for the resampled area 705e. The assumed phase is then incremented by a desired subsample resolution, typically 1/10 of an output pixel 705f. Pixel values smaller than this have been found by trial and error to take too much time and pixel values larger than this have been found to be too insensitive. The resampling, the calculating the contrast measurement and the incrementing the assumed phase steps are repeated until the entire range of a pixel has been searched 705g. The steps of initializing the phase, etc. are then repeated until the desired range of pixel clocks per line have been searched, typically ±10 percent of the initial value 705h. The pixel clocks per line value that produces the maximum contrast is then selected 705i. The data stored at the end of the calibration phase is, as a minimum, horizontal sync pulse length, horizontal line length, input pixel clocks per line, clamp time and interlaced or non-interlaced. The pulse and line lengths may be in number of samples and/or time.

The steps associated with determining the optimum sample rate 706 are as follows. Initially the program sets the number of samples required to the value of the product of the samples per line at the high sample rate (64 MHz) and the number of lines per field 706a. The program then determines whether or not the video is interlaced 706b; if the video is interlaced then the number of samples from the previous step is multiplied times two. The samples per line is then divided by the number of output pixel clock pulses per line. A determination is then made as to whether the result of this division is less than two 706c. That is, it is preferred that at least two samples be available for each output pixel. Preferably, there are two to four samples per output pixel. The number of samples from the first step is then compared to the size of the current memory to determine if it is more or less than the size of the current memory 706d.

If either the number of samples required is more than the size of the current memory, or the number of samples per line divided by the output pixel clocks per line is less than two, then the low sample rate of 32 MHz is set, rather than 64 MHz 706e.

The steps associated with determining or locating the active video area 707 comprise first determining the size of the active video window. The height of the active video window is set to the number of rows covered by full horizontal lines 707a and the width of the video window is set to the number of input pixel clocks per line reduced by the length of the horizontal sync pulse and the clamp length 707b. Both the length of the horizontal sync pulse and the clamp length, as well as the line's length, are in number of samples. After this the program then locates the first full horizontal line of the active video window. Again, the initial values of pixel clocks per line and initial active video window location are used to generate the video presented to the user on the PC's display. The user is then asked to place a box around the active video area desired to be examined for information.

The next step is to store the data representing the determined and set parameters from the foregoing major steps 708. That is, the horizontal sync pulse length and time, the horizontal line length and time, the clamp time, the black level, white level, sync tip level, and sync slice level are all stored in an appropriate memory location. In addition, the video being interlaced or noninterlaced is stored, as well as the number of lines per field and the number of input pixel clocks per line. The optimal sample rate is also stored, as is the location of the active video window (which includes its height, width and first horizontal line ).

As depicted in FIG. 6B, the steps associated with the methods for the acquisition phase of the present invention are as follows. The format of the acquisition of the video signals is the active video and sync pulse indicator information discussed earlier herein and is such that the video signals and sync pulse indicator information are acquired simultaneously. That is, the sync pulse detector is turned on and the full range of video signals are acquired 801. A determination is then made of the number of samples that have been acquired 802. A value corresponding to the number of output pixels is then set equal to the product of the desired output pixel clock per line and the number of lines 803. A value corresponding to the samples per line is then set equal to the number of samples divided by the number of lines 804. Optionally, a phase offset value may be set equal to the remainder of the number of samples divided by the number of lines times the output pixel clocks per line 805. This changes the scale of the phase from zero to 360 degrees, to zero to some number of pixels; this pixel "phase" scale is employed by the precession process described later herein. The value for the full horizontal line length is then set equal to the number of samples per line plus the phase offset 806. The phase offset is defaulted to zero if this option is not selected. In addition, the number of samples per line and the phase offset are stored separately. Following this, the active video area is located based on data from the set up phase 807. After the active video area has been defined and located the phase is then aligned to allow for synchronization with the input pixel clocks per line 808. After this, the image is resampled 809 to the output pixel clocks per line and the resampled image generated.

The determination of the number of samples acquired step 802 locates and counts the maximum number of contiguous complete horizontal lines during the acquisition and then counts the number of samples in this contiguous area. That is, the number of samples acquired value is the number of samples in the number of full horizontal lines actually found. In this manner, the number of output pixels may be adjusted for the number of horizontal lines that were actually found in the video image. The steps required to perform this are to initially locate the first horizontal sync pulse following a first vertical sync pulse 802a. The line is then scanned to determine if the line is a full horizontal line and if so is counted as a line 802b,c. A total number of lines is separately accumulated 802c. In addition, the number of samples in the line is counted and a separate total number of samples for each counted line is also accumulated 802d. The next step is to locate the next horizontal sync pulse 802e and repeat the determination, count and locate steps until preferably the minimum number of horizontal lines has been found 802f. Alternatively, these steps may be repeated until no additional horizontal sync pulse is found and instead a second vertical sync pulse is found. Then the last full horizontal line before the second vertical sync pulse is then set as the last line in the first field 802g and the program then verifies the number of full horizontal lines is equal to the minimum number of full horizontal lines 802h. That is, after counting a number of lines equal to the minimum number of lines, the program may skip over any remaining lines and look for the next vertical sync pulse 802f. The program then locates the first horizontal sync pulse following this second vertical sync pulse and then determines if that line is a full horizontal line 802i. If it is a full horizontal line 802j, then the program calculates the number of lines in the vertical sync pulse by dividing the number of samples in the sync pulse by the number of samples per line 802k. The number of lines calculated for the vertical sync pulse are then added to the total line count 802l and the total number of samples in the vertical sync pulse are added to the total number of sample count 802m. This process continues for all the fields on a field by field basis until all of the samples have been scanned 802n.

The active video window is located, this may involve two fields if the video is interlaced. After the active video window has been located 807, the program uses the contrast measurement 807a,iv to determine the appropriate phase.

The phase is initially set at zero 808b and the windowed area is then resampled with this assumed phase 808c. A contrast measurement of the contrast optimization process is then calculated for the resampled area 808d. The phase is incremented by the desired subsample resolution 808e and then the resampling, calculating and incrementing steps are repeated until the entire range of a pixel has been calculated 808f. The phase with either the minimum contrast measurement shifted by 180°, or the phase with the maximum contrast, is then selected 808g.

After the phase has been aligned 808, the image is then resampled 809. The resampling process basically involves using bilinear interpolation to convert the input samples to the desired output pixels. The mechanism for determining the location of the resampling points relative to the input samples and the voltages associated with these sample positions is determined by a precession technique. The precession technique is the manner in which the location of the next resampling point is calculated from the current resampling point. The precession technique relies upon the distance between resampling points being equal to the number of output pixels. This technique adds a calculated number of samples to determine the new resampling point.

Figure 9:
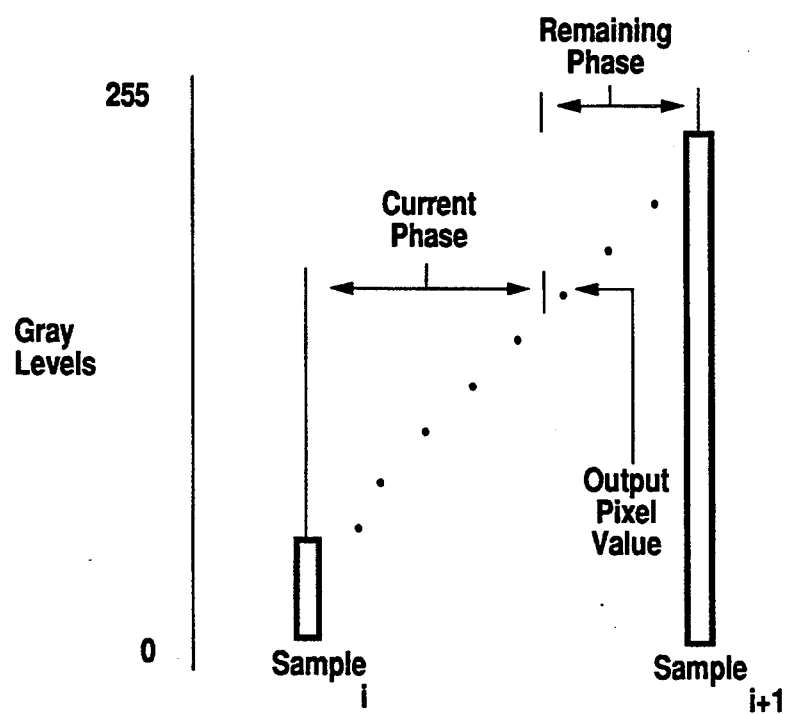
FIG. 9 depicts the phase process during resampling.

The resampling process 809 uses bilinear interpolation, as depicted in FIG. 9, to calculate the value of the next output pixel and then the precession process to locate the next resampling point.

The bilinear interpolation process calculates the next output pixel by using a weighted sum of the two samples surrounding the current resampling point. The resampling point is specified to a subsample resolution by identifying the current sample location and phase. The phase has a range from 0 to a number of output pixels reduced by one and its value represents the distance from the current sample. A phase of 0 means the current resampling point is exactly at the current sample. A phase of the calculated number of output pixels reduced by one places the resampling point adjacent to the next sample.

Figure 10:
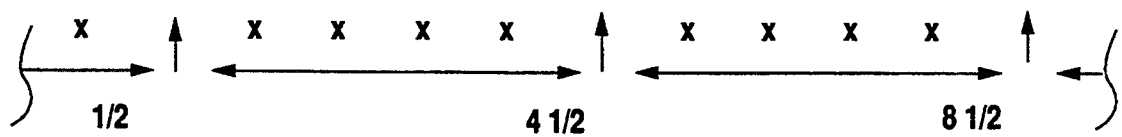
FIG. 10 depicts sampling and resampling locations during resampling.

The precession process, as depicted in FIG. 10, locates the next resampling point. This is done by adding the number of samples to the current phase and then subtracting off the number of output pixels until the phase falls in its valid range, i.e., less than the number of output pixels. Each time the subtraction is performed, the current sample is advanced by one (or incremented by one). Alternatively, this process may be calculated using other similar methods, such as by a division method.

A get the next line function determines which field should be resampled next and then advances the appropriate field line offset. The offsets are advanced by the length of a full horizontal line. In this way, once the offset is set by the locate active video window and align phase routines, the offset is always in phase and pointing to the next resampling point required.

Since only the active video portion is digitized significant data compression of the complete video signal is achieved. That is, the extraneous blanking signals and associated clamp times not necessary to the active video or blank portions of the active video frame are rejected and are not stored or transmitted for later use. As noted hereinbefore, preferably, the output of the resampling process is digitized video of a preselected line resolution.

This digital video form may then be stored either on disk in the PC, or sent as it is being generated to other devices via a LAN or modem. Preferably, the resampled image is stored before it is transmitted to any other device.

The acquisition phase continues to use the contrast optimization process to synchronize with the input pixel clock, so that the input pixel clock value is determined for each frame or frames of video as it is acquired.

Thus it may be seen that the present invention provides methods and apparatus before capturing video images having unknown video formats and storing them or resampling them for later conversion into a desired video format. More particularly, it may be seen that the apparatus of the present invention has a great deal of programmability associated therewith. More particularly, the apparatus has a digitizer with adjustable level for both the digitization of signals as well as the dock signals supplied thereto. In addition, registers are provided for bits that may be set to control various signal levels and clock rates as a function of the control signals represented by the bits. Further, there is special circuitry employed to capture the synchronization pulses as they occur and to store data with the synchronization flags to indicate when the synchronization pulse has been detected via a high bit. Further, although the resampling process described herein has been for vertical resampling, it may also be employed to perform horizontal resampling.

Many other variations and modifications may be made in the apparatus and techniques hereinbefore described, by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

What is claimed is:

1. A method of determining unknown video parameters of an input video signal that represents images scanned at an unknown input pixel frequency and vertical and horizontal synchronization (sync) frequencies, that define fields and lines of the image, respectively, comprising the steps of:

determining a horizontal sync pulse length parameter and a horizontal line length parameter by (1) receiving said input video signal, (2) sampling a portion of said input signal with a sampling frequency that is asynchronous to the scanning frequencies of said input signal, thereby obtaining a set of digital samples representative of said vertical and horizontal sync pulses, (3) storing said set of samples, (4) determining a start sample and a stop sample of each of said sync pulses, (5) counting the number of samples that represent each of said sync pulses, such that a set of sync pulse length values is obtained, (6) processing said sync pulse length values to determine a horizontal sync pulse length parameter, (7) counting the number of samples per period of said sync pulses, such that a set of line length values is obtained, (8) processing said line length values to determine a horizontal line length parameter, and (9) storing said horizontal sync pulse length parameter and said horizontal line length parameter in memory.

2. The method of claim 1, wherein said processing steps are performed by creating histograms of said sync pulse values and of said line length values and selecting the most frequently occurring of said values.

3. The method of claim 1, further comprising the step of setting a trigger count for acquiring samples to a value that is approximately twice said horizontal sync pulse length parameter, such that said trigger count distinguishes a vertical sync pulse from a horizontal sync pulse.

4. The method of claim 1, further comprising the step of setting a clamp time parameter as the minimum of said horizontal sync pulse length parameter or a value based on said horizontal line length parameter.

5. The method of claim 1, wherein said sampling step is performed such that said sampling frequency is less than an expected value of said input pixel clock frequency.

6. The method of claim 1, further comprising the step of determining the active video level parameters of said input signal by (1) choosing a maximum signal value and a minimum signal value, (2) sampling said input signal to obtain a set of digital samples having amplitudes between said maximum signal value and said minimum signal value, (3) digitizing said samples such that they are representative of the range of all amplitudes of said input signal, (4) determining a maximum sample value and a minimum sample value, (5) setting a white voltage parameter equal to said maximum sample value, (6) setting a black voltage parameter equal to zero volts, (6) setting a sync tip voltage parameter equal to said minimum sample value, and (7) setting a sync slice voltage parameter to a value between zero and said sync tip voltage parameter.

7. The method of claim 1, further comprising the step of determining whether said input signal is interlaced by (1) defining a vertical sync pulse parameter as a value at least two times said horizontal sync pulse length parameter, (2) using said horizontal line length parameter to define the line length of a full horizontal line of said lines, (3) locating the last full horizontal line of said lines in a first field, (4) locating the leading edge of the vertical sync pulse that defines the beginning of a second field, (5) calculating the distance between the beginning of said last full horizontal line and said leading edge, (6) determining whether the result of said calculating step is a value equal to said line length, and (7) repeating steps (2)–(6) with respect to said second field and a third field.

8. The method of claim 1, further comprising the step of determining a lines per field parameter by (1) defining a vertical sync pulse parameter as a value at least two times said horizontal sync length parameter, (2) using said line length parameter to define the line length of a full horizontal line of said lines, (3) locating the first full horizontal line of said lines in a first field, (4) locating the last full horizontal line of said lines in said first field, (5) counting the number of lines from said first full horizontal line to said last full horizontal line to obtain a first line number, (6) determining the number of line lengths that occur during a vertical blanking period, (7) adding the results of steps (5) and (6) to obtain a first line count, (8) if said signal is not interlaced, setting said lines per field parameter equal to said first line count, and (90) if said signal is interlaced, repeating steps (3)–(6) for a second field to obtain a second line number, selecting the smaller value of said first line number and said second line number, adding said smaller value to the results of repeated step (6) to obtain a second line count, and setting said lines per field parameter to the average of said first line count and said second line count.

9. The method of claim 8, wherein said step of counting the number of lines is performed by locating each next horizontal sync pulse, counting the number of samples between said next sync pulse and a prior sync pulse, and comparing said number of samples to said line length parameter.

10. The method of claim 8, wherein said step of determining the number of lines that occur during a vertical blanking period is performed by counting the number of samples between said last full line of said first field and a first full line of a next field and dividing said number of samples by said line length parameter.

11. The method of claim 8, further comprising the step of locating the height and width of an active video area by (1) if said input signal is non-interlaced, setting the height equal to said lines per field parameter less the number of lines that occur during a vertical sync pulse, (2) if said input signal is interlaced, setting the height equal to twice the result of step (1), and (3) setting the width equal to said line length parameter less said horizontal sync pulse parameter.

12. A method of determining unknown video parameters of an input signal that represents images that have been scanned with known vertical and horizontal synchronization (sync) frequencies, and pulse widths which define fields and lines of the image, respectively, comprising the steps of:
(1) determining the dimensions of an active video area of said input signal, (2) sampling a portion of said input signal that represents the active video area, thereby obtaining a set of field samples, (3) estimating the number of pixels per line of said input signal, (4) re-sampling said field samples at a re-sampling frequency in accordance with the estimated pixel per line value and an initial phase value, (5) calculating a contrast value for the data obtained in said resampling step, (6) repeating said re-sampling, calculating, and incrementing steps for a range of phase values, (7) repeating said re-sampling, calculating, and repeating steps for a range of estimated pixel per line values, thereby obtaining a set of re-sampling values and corresponding contrast values, and (8) selecting an input pixel frequency parameter as the re-sampling frequency for which said calculating step results in the greatest value of said contrast values, or as the value for which said calculating step results in the smallest value of said contrast values plus 180 degrees.

13. The method of claim 12, wherein said step of estimating the number of pixels per line is performed by determining the number of lines per image of said input signal times the aspect ratio of said image.

14. The method of claim 12, further comprising the step of selecting a high contrast area within said active video window prior to said sampling step, and wherein said re-sampling step is performed on a portion of said input signal corresponding to said high contrast area.

15. The method of claim 14, wherein said step of selecting a high contrast area is performed by displaying said image such that a viewer may perceive said high contrast area.

16. The method of claim 12, further comprising the step of determining an optimum sampling frequency parameter by (1) using a proposed sampling frequency and said known horizontal sync pulse frequency to calculate a proposed number of samples per line, (2) dividing said proposed number of samples per line by the number of pixels per line corresponding to said input pixel frequency parameter, and (3) if the result of said dividing step is less than two, increasing said proposed sampling frequency.

17. A method of determining a phase alignment value for generating an image from an input signal that represents images that have been scanned with known vertical and horizontal synchronization (sync) frequencies, that define fields and lines of the image, respectively, and a known pixel frequency, comprising the steps of:
(1) determining the dimensions of the active video area of said input signal, (2) sampling a portion of said input signal that represents an active video area, with a frequency that is synchronous to said known pixel frequency of said input signal and that has a known phase value, thereby obtaining a set of field samples, (3) calculating a contrast value for the data obtained in said sampling step, (4) incrementing said known phase value, (5) repeating said sampling, calculating, and incrementing steps for a complete phase cycle, thereby obtaining a set of phase values and corresponding contrast values, and (6) selecting said phase alignment value as the one of said phase values corresponding to the maximum value of said contrast values or as 180 degrees plus the one of said phase values corresponding to the minimum value of said contrast values.

18. The method of claim 17, further comprising the step of selecting a high contrast area within said active video window prior to said sampling step, and wherein said re-sampling step is performed on a portion of said input signal corresponding to said high contrast area.

19. The method of claim 18, wherein said step of selecting a high contrast area is performed by displaying said image such that a viewer may perceive said high contrast area.

20. A method of generating output pixels for an output image, from an input signal that represents images that have been scanned with known vertical and horizontal synchronization (sync) frequencies, which define fields and lines of the image, respectively, and a known input pixel frequency, comprising the steps of:
(1) sampling a portion of said input signal representing an active video area, using a sample frequency that is asynchronous to said output pixel frequency, thereby obtaining a set of image samples, (2) determining a current phase value for aligning a re-sampling signal with a first sample of said image samples, said first sample representing the first sample of a first line of said image, (3) using said re-sampling signal to obtain a current re-sample value of said image samples, (4) setting a remaining phase value equal to the number of output pixels in said image minus said current phase value, (5) re-sampling said image samples to obtain a next re-sample value, (6) multiplying said current re-sample value times said remaining phase value, (7) multiplying said next re-sample value times said current phase value, (8) calculating the value of a next output pixel by adding the product of steps (6) and (7) and dividing said product by the number of output pixels in said image minus one, (9) calculating the location of a next re-sampling point, (10) repeating steps (4)–(9) for each output pixel on said first line, such that said next re-sample value becomes the next current re-sample value, and (11) advancing said re-sampling point by a line length, and (12) repeating steps (2)–(10) for each line of said image.

21. The method of claim 20, wherein said step of determining a current phase value is performed by (1) determining the dimensions of an active video area of said input signal, (2) sampling a portion of said input signal that represents an active video area, with a frequency that is synchronous to said known pixel frequency of said input signal and that has a known phase value, thereby obtaining a set of field samples, (3) calculating a contrast value for the data obtained in said sampling step, (4) incrementing said known phase value, (5) repeating said sampling, calculating, and incrementing steps for a complete phase cycle, thereby obtaining a set of phase values and corresponding contrast values, and (6) selecting said current phase value as the one of said phase values corresponding to the maximum value of said contrast values or as 180 degrees plus the one of said phase values corresponding to the minimum value of said contrast values.

22. The method of claim 20, wherein said step of calculating the location of a next re-sampling point is performed by calculating a phase offset as said current phase value plus the number of samples in said set of image samples, subtracting the total number of pixels in an image from said phase offset to obtain a new phase offset, incrementing a re-sampling point by one sample value, repeating said subtracting and incrementing steps until said new phase offset value is less than the number of output pixels in an image.

* * * * *